Nov. 5, 1963  C. B. NORRIS  3,109,766
CELLULAR CORE FOR CURVED SURFACES
Filed Sept. 21, 1960  2 Sheets-Sheet 1

INVENTOR:
CHARLES BRAZER NORRIS
BY
Attorney

Nov. 5, 1963  C. B. NORRIS  3,109,766
CELLULAR CORE FOR CURVED SURFACES
Filed Sept. 21, 1960  2 Sheets-Sheet 2

INVENTOR:
CHARLES BRAZER NORRIS
BY
Attorney

United States Patent Office 3,109,766
Patented Nov. 5, 1963

1

3,109,766
CELLULAR CORE FOR CURVED SURFACES
Charles Brazer Norris, Madison, Wis., assignor to the United States of America as represented by the United States Atomic Energy Commission
Filed Sept. 21, 1960, Ser. No. 57,596
3 Claims. (Cl. 161—68)

The present invention relates generally to cellular core structures or honey-comb-like constructions, and more particularly to an improved cellular core for conforming to curved or cylindrical surfaces.

"Sandwich" panels comprising a cellular or honeycomb core between a pair of generally planar panels are well known and have been used in aircraft construction for a number of years. Such cores have comprised corrugated sheets bonded together or flat sheets bonded together and then expanded. In some instances panels have been of some moderate curvature and in other instances it has been attempted to increase the curvature by expedients such as corrugating appropriate portions of the cell walls. Even with such expedients, however, it has been impracticable or undesirable to try and bend previously known cores to radii of the same order of magnitude as their thickness. When bent in one direction, for example toward cylindrical shape, previously known core materials develop a "saddle" or opposite curvature in the axial direction of the cylinder, referred to as an anticlastic curvature. In other words, when previous core materials are bent into a convex shape in one direction they assume a concave shape, at both inner and outer surfaces, in a perpendicular direction. The resulting shape can not be forced into desired truly cylindrical shape without damaging the core material and that resulting shape does not afford required complete and optimum supporting contact between the faces of the cellular core and the surface or surfaces that are to be covered or supported.

It has been attempted to make conventional cores fit curved surfaces by expanding the core from a collapsed manufactured position, thereafter machining the core to the desired shape, or by an alternate method of cutting into the core or "block" a correction estimated to remove the portions which will, when expanded, be affected by anticlastic distortion. Such methods of attempting to circumvent anticlastic distortion are objectionable as they add time-consuming and expensive extra steps to the manufacturing process and due to the fact that in the completed "sandwich" article not all cells and their walls are normal to the covering panel or surface covered by the core. Only the walls of those cells on a line around the center of a cylinder would be normal to an adjacent covering panel; in directions away from such line the cells and their walls are angled away from normal to the panel, and as distance from the line increases so does the angle. Angled cell walls do not carry as great a radial load as those that abut against and are normal to a covering surface; overall resistance of a final assembly to radial loads suffers in a manner proportional to the quantity of angled cell walls and their deviation from normal. This angling drawback is even more objectionable than that of the aforementioned extra time and expense required to try and cut a correction into a cellular core material.

The present invention aims to overcome the above and other difficulties or disadvantages by providing a new and improved cellular core which may be shaped to surfaces of single curvature, e.g., cylindrical, without developing objectionable anticlastic curvature, and which may abut against a curved or cylindrical panel, or against a pair of sandwiching panels, with all its cell walls disposed substantially perpendicular to the panels so that all cell walls may carry their full share of any imposed loads.

An object of the present invention is to provide a new and improved cellular core.

Another object of the invention is to provide an improved cellular core that may be shaped to surfaces of single curvature without developing objectionable anticlastic curvature.

Another object of the invention is to provide an improved cylindrical, or partially cylindrical, sandwich type construction.

Other and further objects of the invention will be obvious upon an understanding of the illustrative embodiment about to be described, or will be indicated in the appended claims, and various advantages not referred to herein will occur to one skilled in the art on employment of the invention in practice.

A preferred embodiment of the invention has been chosen for purposes of illustration and description. The preferred embodiment is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figures 2, 3, 4:
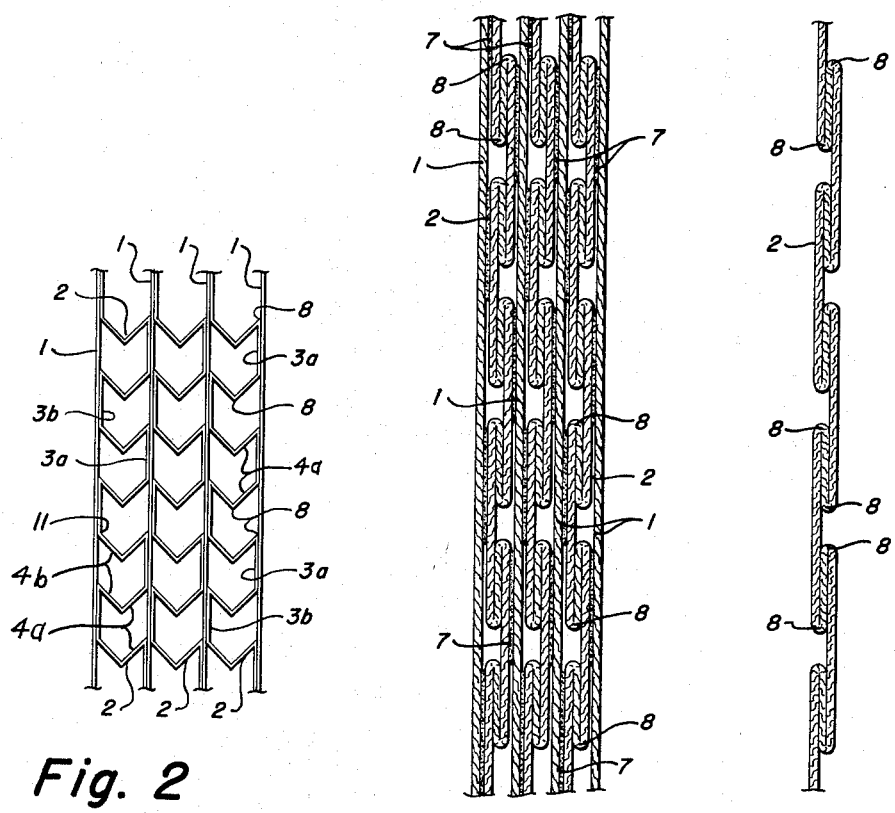
FIG. 2 is a view looking endwise into the cells of the present cellular core structure.
FIG. 3 is a view looking endwise into a cellular core structure but with the cellular core in a collapsed or folded relationship.
FIG. 4 is an end view showing, in collapsed or folded position, a single pleated element of the cellular core that is shown in FIGS. 1–3.

A portion of the cellular core is illustrated in FIGS. 2 and 3 as it may exist when resting on a flat surface, FIG. 2 being expanded from the collapsed or folded relationship of FIG. 3. As shown, the cellular core comprises a plurality of parallel unpleated or unfolded strips of paper or other suitable material 1 each of which is spaced from an adjacent straight strip or strips by an intermediate pleated paper strip 2. Creases or fold lines of the pleated strip extend transversely thereof at appropriate locations and divide the strip into longitudinally spaced and offset face portions 3a and 3b, that are joined and overlapped by adjacent interconnected fold portions 4a and 4b. The face portions 3a and 3b are alternately offset with respect to each other and those at one side of a pleated strip are secured to one of the straight strips and those at the opposite side thereof are secured to the next adjacent straight strip. Each fold 4a—4b extends inwardly so as to overlap or overlie on adjacent secured face portion 3a, 3b.

While excellent results are afforded by gluing the face portions 3a and 3b to the straight strips, they may be attached in any other suitable manner, for example by sewing or stapling.

In manufacturing a cellular core the desired number of intermediate strips may first be pleated to the configuration as indicated in FIG. 4, then glue or adhesive 7 (FIG. 3) coated on the surfaces of the strips that are to be secured to surfaces of adjacent straight strips. A number of such pleated and straight strips may be "stacked" as shown and then placed in a press where the glue is allowed to set. The slab of cellular material made in such manner and of appropriate size may then be expanded to the relationship of FIG. 1 or 2 by pulling in a direction generally perpendicular to the lengths of the straight strips 1. In applying the glue it is preferably placed so as to be spaced "inwardly" somewhat from the creases or fold lines 8, to thereby minimize or obviate bonding these creases to a closed position.

As a slab is expanded from the position of FIG. 3 the folds of material 4a, 4b adjacent the creases 8 gradually separate and the pleated strip bends adjacent its secured face portions 3a and 3b to form the creases or fold lines 11. The adhesive 7 should be so applied as to have the crease 11 form at the proper location.

The pleats in the intermediate strips 2 may readily be formed by Chandler pleaters that are well known in the garment industry and may be of such dimensions as to form cells of desired size.

While any suitable materials may be employed to construct the cellular core, e.g., paper, aluminum or magnesium, magnesium foil, fabric, etc., excellent results have been obtained with strips of desired weight kraft paper, pleated into half inch box pleats.

When the glue 7 has dried, in air or in a drying oven, the cellular core may be trimmed and then expanded to cylindrical or other desired shape, opposite ends glued together and glued adjacent its cell ends onto a curved panel or panels 12 and 13. However, where the greater constructional strength, ruggedness, and the like of aircraft and missile applications are required, the expanded paper core is preferably impregnated with a suitable synthetic resin material.

Impregnation may be obtained by supporting the expanded core on an "inner" panel or mandrel 12 so that the cells are closed at one end and so that a portion of its open core ends face upwardly, pouring liquid resin material into the cells so as to fill them, gradually turning the mandrel so as to present additional cells for filling and to tilt previously filled cells for emptying and draining. Filling the cells in this manner insures uniform impregnation and if the resin has long enough pot life that which drains out of the cells may be used to impregnate newly presented cells.

The mandrel or panel may be rotatably mounted and may be rotated rapidly to throw off excess resin by centrifugal force or at a slower rate to facilitate curing. One or more coatings of resin may be applied to achieve desired qualities of weight, strength, water resistance, or the like. Jelling of the impregnating resin may be by oven heating of the cellular core at appropriate temperature and while rotating at slow speed; the rotation minimizes resin flow which sometimes tends to occur due to a viscosity decrease incident to jelling. Thereafter any desired heat treating steps may be performed.

The impregnating resins used may be of various kinds and will depend upon manufacturing problems or factors such as strength, brittleness, expense, availability. Phenolics, polyesters or epoxy resins are each appropriate for various situations.

The described cellular core is readily expandable to conform to curved surfaces or cylinders of various radii and hence is not limited to use with a surface of only one radius. There is no practical lower limit of radius to which the described cellular core will not closely and readily conform.

In instances where highly accurate conformance of cell ends to a curved or cylindrical surface is desired the curved cellular core may be machined subsequent to impregnation by employing a high speed tool post grinder with cutter.

Figure 1:
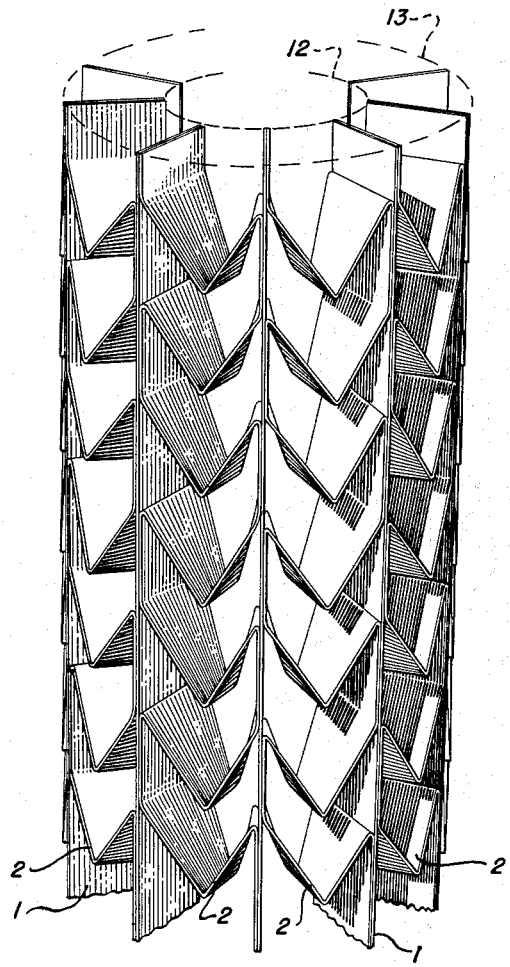
FIG. 1 is a perspective view showing the improved cellular core in expanded substantially cylindrical shape.

It has been found that the described cellular core may be expanded to a cylindrical shape such as shown in FIG. 1 without developing the very objectionable anticlastic curvature of previous known cores. The intermediate folded strips readily afford expansion of the core and the walls of the resulting cells are disposed normally to inner and/or outer cylindrical or other curved surfaces 12, 13 about which the core is expanded, so that all cell walls carry their full share of any loadings, throughout the entire area of the cellular core. When impregnated as hereinbefore described the cellular core or sandwich incorporating it will be found to constitute a very strong, waterproof core which may be used for a multiplicity of purposes in construction of aircraft, missiles, etc. It is of light weight, and may be readily manufactured in any desired size from inexpensive materials by relatively unskilled labor.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A cellular core comprising a plurality of spaced apart strips of material generally parallel with each other, and a continuous strip of material intermediate each pair of adjacent straight strips formed into a plurality of offset face portions secured at oppositely disposed surfaces and over approximately one-half the respective areas thereof to adjoining portions of said straight strips at spaced apart locations such that the secured surfaces of spaced apart face portions secured to one of said pair of straight strips are each out of overlapping relationship with the secured surfaces of intermediate offset face portions secured to the other of said pair of straight strips, said face portions each including a pair of edges one at each end of the secured surface wherein each edge of each face portion secured to said one straight strip is directly oppositely disposed from an edge at the opposite end of a face portion secured to said other straight strip, said oppositely disposed edges being interconnected by intermediate substantially V-shaped fold portions each of which normally partially overlies part of only a single adjacent secured surface.

2. A cellular core as claimed in claim 1, comprised of paper impregnated with a synthetic resin.

3. A cellular core as claimed in claim 1, having secured thereto and spacing apart from each other a pair of surface members of at least partial circular arc configuration, and with said strips of material being disposed generally perpendicular to the curved surfaces of said surface members.

References Cited in the file of this patent

UNITED STATES PATENTS

| | | |
|---|---|---|
| 563,775 | Lantzke | July 14, 1896 |
| 2,079,297 | Manning | May 4, 1937 |
| 2,668,327 | Steele | Feb. 9, 1954 |
| 2,742,387 | Guiliani | Apr. 17, 1956 |
| 2,750,313 | Schwartz et al. | June 12, 1956 |

FOREIGN PATENTS

| | | |
|---|---|---|
| 124,958 | Sweden | May 17, 1949 |
| 451,578 | Italy | August 1950 |
| 525,128 | Canada | May 15, 1956 |